United States Patent [19]

Holden

[11] Patent Number: 4,667,517

[45] Date of Patent: May 26, 1987

[54] RAPID RESPONSE PRESSURE GAUGE SPRING

[76] Inventor: Edward S. Holden, 16 Lowell St., Cambridge, Mass. 02138

[21] Appl. No.: 819,250

[22] Filed: Jan. 15, 1986

[51] Int. Cl.⁴ .............................................. G01L 7/04
[52] U.S. Cl. ....................................... 73/743; 72/367; 73/756
[58] Field of Search ................. 73/741, 742, 743, 756; 72/367

[56] References Cited

U.S. PATENT DOCUMENTS

| | | |
|---|---|---|
| 1,521,343 | 12/1924 | Townsend . |
| 1,714,988 | 5/1929 | Schlaich . |
| 2,495,314 | 1/1950 | Caldwell . |
| 2,522,780 | 9/1950 | Dickson . |
| 3,232,116 | 2/1966 | Perkins . |
| 3,382,720 | 5/1968 | Young . |
| 3,986,400 | 10/1976 | Schmaus .............................. 73/741 |
| 4,191,056 | 3/1980 | Holden . |

Primary Examiner—Donald O. Woodiel

[57] ABSTRACT

In general, the invention features a spring assembly for a gauge comprising a hollow metal tube adapted to change in volume in response to differential pressures applied across its walls, the tube having a neck portion adapted to be connected to a fitting of the gauge, a body portion connected at one end to the neck portion, the walls of the body portions being flattened and their peripheral portions being compressed by cold working to a reduced thickness to thereby increase their yield point to a spring temper and their central portion being compressed relatively less than their peripheral portions to form an axially extending channel which provides for enhanced pressure transmission along the tube, and the other end of the body portion being sealed, the interior of the neck portion adapted to be in pressure communication with the fitting, and the interior of the body portion adapted to be in pressure communication through the channel with the interior of the neck portion, whereby a change in the pressure applied to the fitting is communicated along the interior of the body portion through the channel changing the differential pressure across the walls of the body portion and causing a corresponding change in the volume.

8 Claims, 8 Drawing Figures

RAPID RESPONSE PRESSURE GAUGE SPRING

BACKGROUND OF THE INVENTION

This invention relates to pressure responsive spring gauges for measuring pressure, temperature or the like, and more particularly is an improvement of the spring element made from cold worked metal which is the subject of my U.S. Pat. No. 4,191,056, issued Mar. 4, 1980, the disclosure of which I incorporate herein by reference.

In my U.S. Pat. No. 4,191,056, I describe a spring element of the Bourdon tube variety, made by compressing the conventionally flattened walls of a metal tube to a reduced thickness to increase its yield strength and provide it with a spring temper. Such a gauge can be fabricated from a relatively inert metal, and particularly from stainless steel, and provides an inexpensive solution to a broad range of difficult applications wherein previously the pressurized fluid had a tendency to react with the thin-walled metal causing the tube to develop leaks.

SUMMARY OF THE INVENTION

I have now discovered that the response of such a gauge is greatly enhanced by compressing or cold working only the peripheral portions of the flattened tube walls relative to their center to provide an axially extending channel for rapid transmission of pressure change. In addition to greatly improving reaction time, the channel also provides an effective means for controlling the arc or range of swing of the gauge to accommodate different applications.

In general, the invention features a spring assembly for a gauge comprising a hollow metal tube adapted to change in volume in response to differential pressures applied across its walls, the tube having a neck portion adapted to be connected to a fitting of the gauge, a body portion connected at one end to the neck portion, the walls of the body portions being flattened and their peripheral portions being compressed by cold working to a reduced thickness to thereby increase their yield point to a spring temper and their central portion being compressed relatively less than their peripheral portions to form an axially extending channel which provides for enhanced pressure transmission along the tube, and the other end of the body portion being sealed, the interior of the neck portion adapted to be in pressure communication with the fitting, and the interior of the body portion adapted to be in pressure communication through the channel with the interior of the neck portion, whereby a change in the pressure applied to the fitting is communicated along the interior of the body portion through the channel changing the differential pressure across the walls of the body portion and causing a corresponding change in the volume.

In preferred embodiments, the walls of the body portion are not cold worked along their central portion; the peripheral portions of the walls of the body portion are cold worked to a reduced thickness of 70 to 95 percent of their original thickness; the tube is thin-walled stainless steel about 0.002 to 0.003 inch thick; the central portions of the walls of the body portion extend from the peripheral portions in the same direction, one of the central portions having a convex wall portion and the other having a concave wall portion, the body portion is flattened longitudinally forming a helix, and the convex wall portion is directly radially outward or inward to provide respectively a long or short swing in response to pressure changes.

DESCRIPTION OF THE PREFERRED EMBODIMENT

I first briefly describe the drawings.

Drawings

Figure 4:
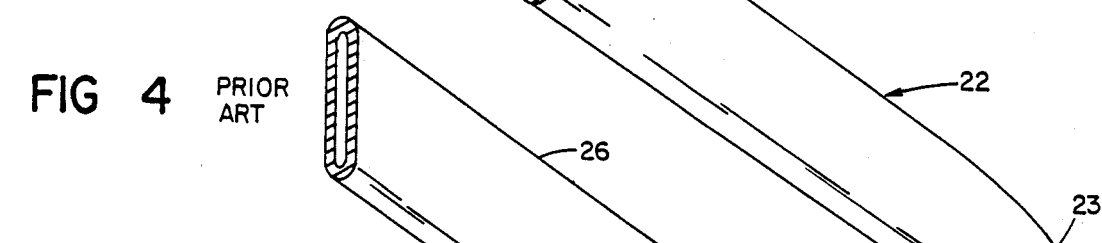

FIG. 4 is an enlarged perspective view, partially broken away, of a spring element shown in an intermediate stage of fabrication after it has been cold worked as described in my U.S. Pat. No. 4,191,056.

Figure 1:
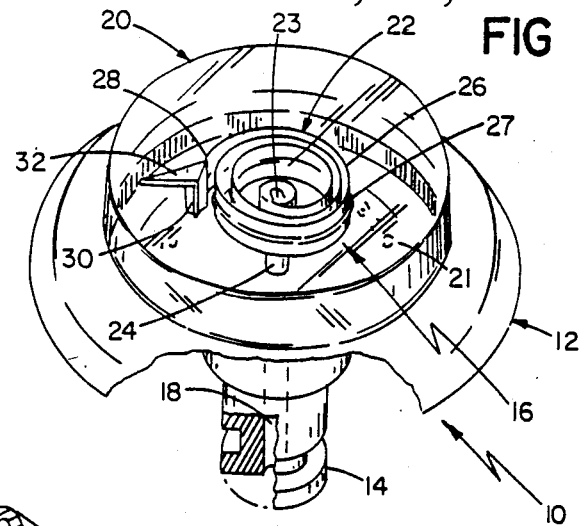
FIG. 1 is a perspective view, partially broken away, of a pressure gauge having a spring element according to the present invention.
Figure 5:
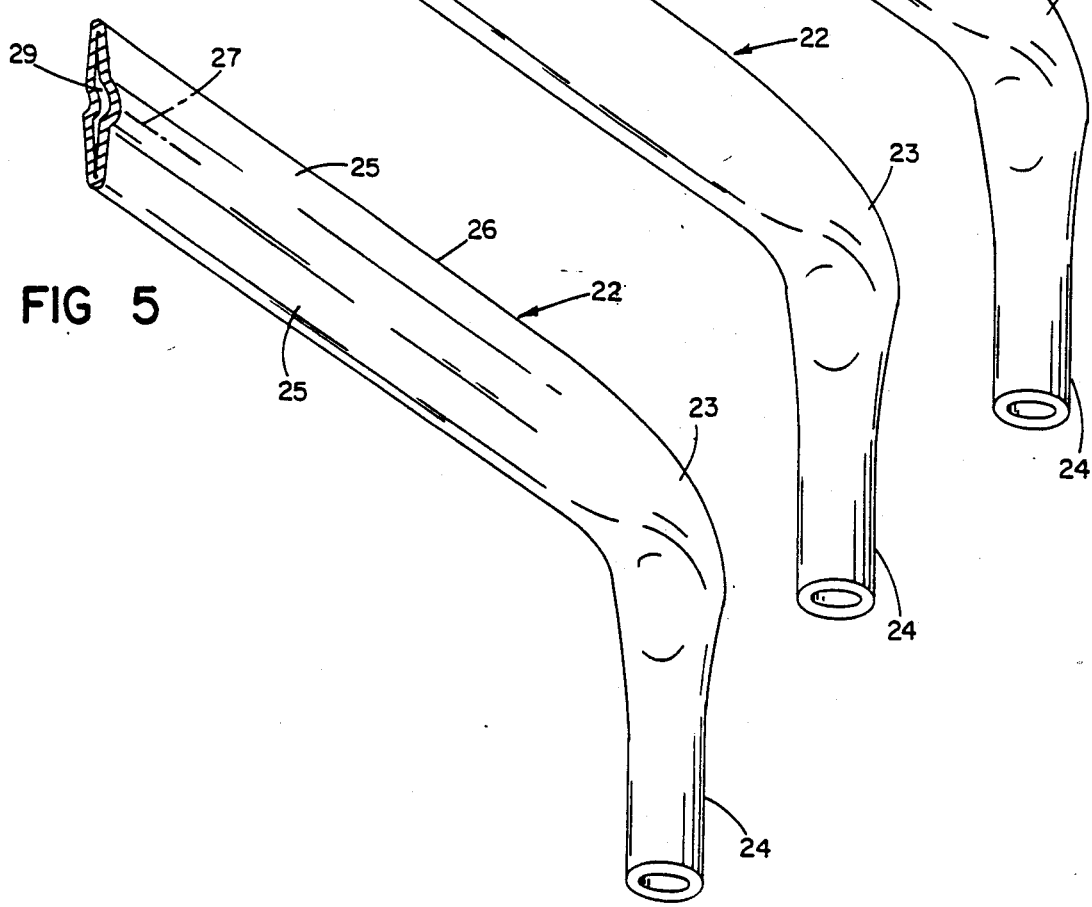

FIG. 5 is an enlarged perspective view, partially broken away, of the spring element of FIG. 1, shown in an intermediate stage of fabrication after it has been cold worked in accordance with the present invention.

Figure 6:
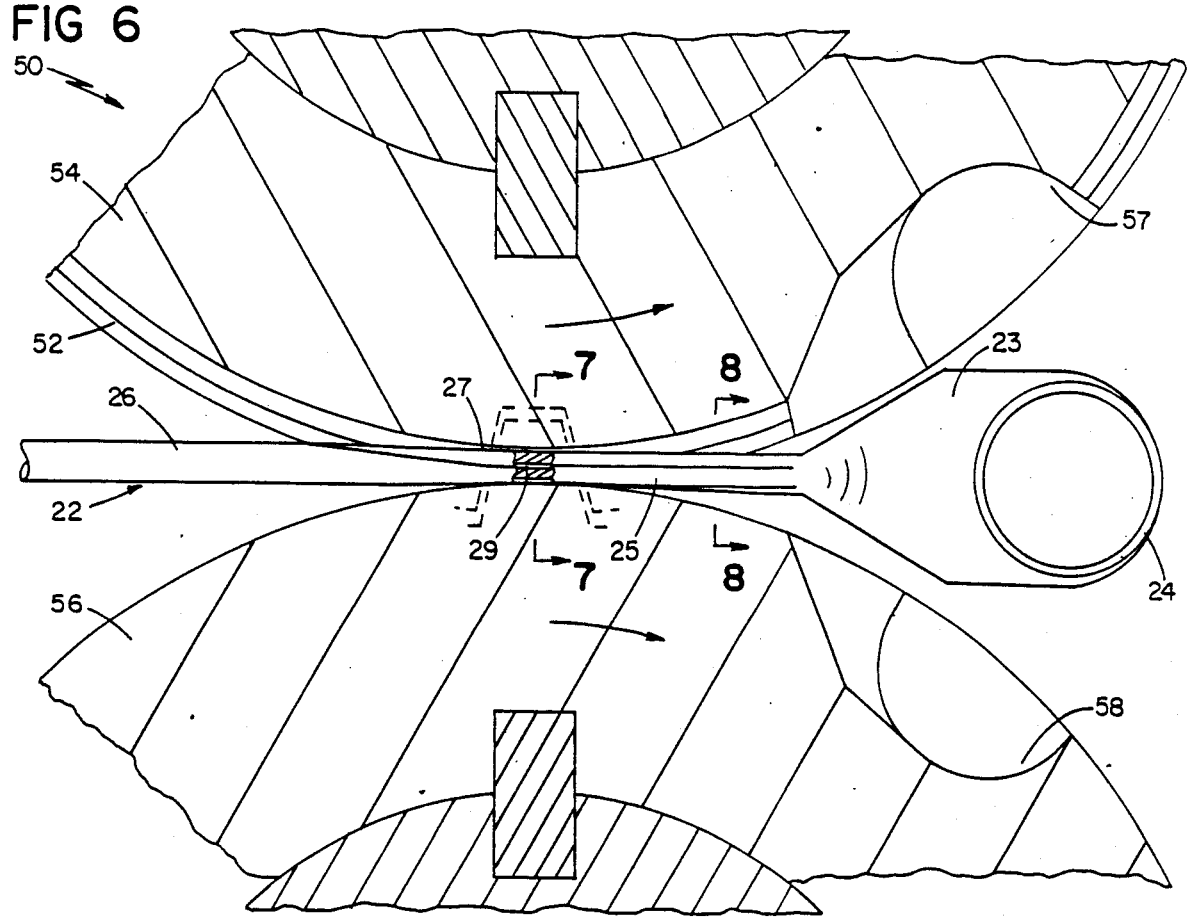

FIG. 6 shows a portion of a rolling machine used to cold work the spring assembly of FIG. 5.

Figure 7:
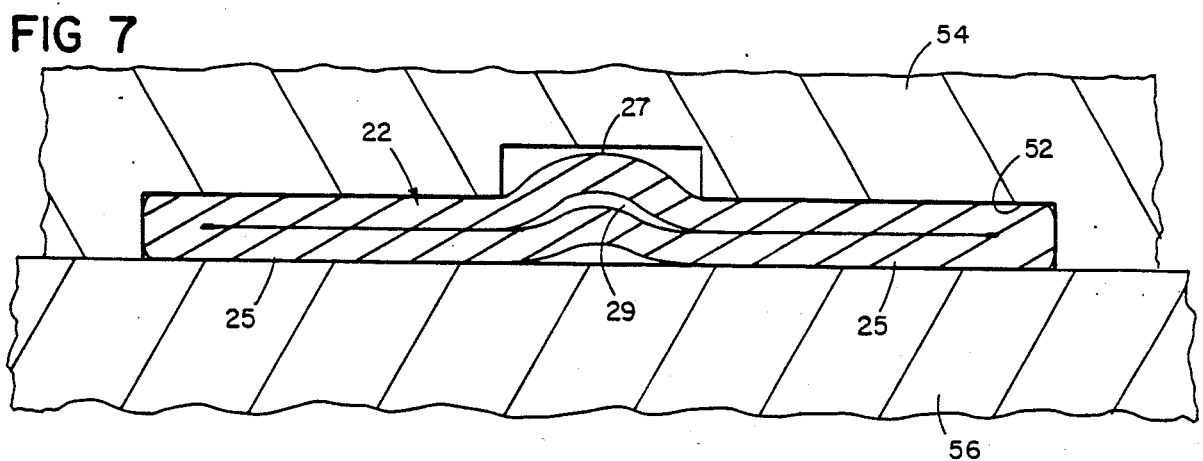

FIG. 7 is a section, partially broken away, through 7—7 of FIG. 6.

Figure 8:
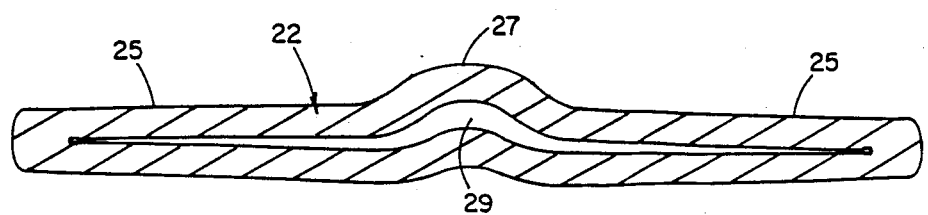

FIG. 8 is a section through 8—8 of FIG. 6.

STRUCTURE

FIG. 1 shows a pressure gauge 10 having a stainless steel base 12, stainless steel pressure fitting 14 with an axially extending bore 18 therethrough mounted in a central hole in the base, a spring assembly 16 connected to the bore in the fitting, and a clear plastic lens 20 secured around its periphery to the base and projecting outwardly therefrom. The face of the base is provided with indicia 21.

Figure 2:
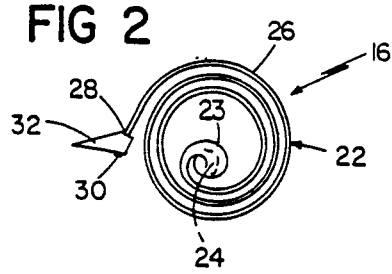
FIG. 2 is a plan view of the spring element of the gauge of FIG. 1.

Referring to FIGS. 1 and 2, spring assembly 16 comprises a thin-walled stainless steel tube 22 having a neck portion 24 adapted to be sealingly connected in bore 18 of fitting 14, a transition portion 23, a transversely flattened body portion 26 longitudinally coiled in a helix, and a nose portion 28 sealed with a silver solder bead or weld 30. Pointer 32 is attached to nose 28 by solder bead 30.

MANUFACTURE AND OPERATION

Figure 3:
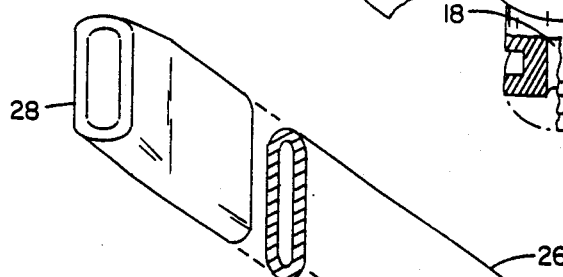
FIG. 3 is an enlarged perspective view, partially broken away, of the spring element of FIG. 1, shown in an intermediate stage of fabrication prior to cold working.

FIGS. 3 and 5 show the spring assembly of FIG. 2 in intermediate stages of construction. First, as shown in FIG. 3, tube 22 is bent at a right angle at transition portion 23 to form a neck portion 24, and is flattened in the conventional way to form a body portion 26 and a nose portion 28. As shown in FIG. 4, in one embodiment described in my U.S. Pat. No. 4,191,056 tube 22 is cold worked uniformly across its body portion 26 to a spring temper. As shown in FIG. 5, in accordance with the present invention, tube 22 is cold worked along the peripheral portions 25 of body portion 26, the walls of the tube being reduced in thickness along their peripheral portions to increase their yield strength and provide a spring temper, while the portions of the tube walls along central axis 27 of the body portion, are not cold worked or are cold worked to a relatively lesser degree, to form axially extending channel 29 that provides a passage for pressure transmission along the tube.

Referring to FIGS. 6-8, the tube 22 of FIG. 3 is cold worked as shown in FIG. 5 by compressing it between rollers 54, 56 in machine 50. Groove 52 in roller 54, is adapted to receive body portion 26 of the tube and is shaped to press peripheral portions 25 of the body portion against opposed roller 56 and thereby squeeze it to a reduced wall thickness, while the portion of the tube along its central axis 27 is not compressed by the rollers and forms axially extending channel 29. Opposed recesses 57, 58 are adapted to receive the neck and transition portion of the tube to prevent them from being squeezed between the rollers and to pull the tube through the rollers.

As shown in FIG. 2, the flattened cold worked body portion 26 is wound into a helix. A bead of silver solder or weld 30 is placed in the nose 28 to seal the end of the tube 22, and at the same time to fasten a pointer 32 to the nose.

In operation, fitting 14 is connected to a source of pressure (not shown). The pressure is communicated through bore 18 and neck 24 of tube 22 to body portion 26. Channel 29 provides for rapid transmission of pressure along the axis of the tube, resulting in greatly improved reaction time. The pressure causes the body portion to increase in volume and the helix to unwind, moving the pointer 32 through an arc measured by indicia 21. Subsequent increases in pressure cause the body portion 26 to unwind further measured amounts. Similarly, subsequent decreases in pressure cause corresponding decreases in the volume of tube 22 and the body portion 26 will wind up a measured amount. I have found that the orientation of channel 29 can be varied to provide a means for adjusting the arc or swing of the gauge to meet the requirements of different applications. In particular, by orienting the convex face of the channel radially outwardly, as shown in FIG. 1, the swing of the gauge in response to a given pressure change will be over a relatively longer arc, whereas orienting the convex face of the channel in a radially inward direction provides a relatively shorter swing.

I have made a 100 psig gauge (at a throw of 55° degrees) from a type 316 or 304 stainless steel tube (3 inches long×0.062 inch outside diameter×0.002 inch wall thickness) by reducing the wall thickness at the periphery by approximately 5 percent (to approximately 0.0019 inch). I have also recently made a 195 psig gauge (at a throw of 55 degrees) from a type 316 or 304 stainless steel tube (3½ inches long×0.062 inch outside diameter×0.003 inch wall thickness) by reducing the wall thickness to approximately 0.00285 inch. In both these gauges the flattened walls of the body were about 0.095 inch wide and each of the cold worked peripheral portions was about 0.038 inch wide.

ALTERNATIVE EMBODIMENTS

Other embodiments are within the scope of the following claims. I have found that the spring element of FIG. 5 requires relatively less cold working than that of FIG. 4 because channel 29 provides a stiffening effect. Accordingly, I have found that for thin-walled stainless steel tubes, cold working the peripheral portions of the tube to a 5 to 30 percent reduction in wall thickness provides an adequate spring temper and increase in yield strength. The specific reduction needed for each particular application (and the corresponding geometry of the groove in roller 54) is readily determined using known cold working principles. For example, more ductile metals (e.g., stainless steel having lower carbon contents) would require a correspondingly greater amount of cold working. Also tubes having thicker walls require correspondingly less cold working.

What is claimed is:

1. A spring assembly for a gauge comprising:
   a hollow metal tube adapted to change in volume in response to differential pressures applied across the walls thereof, said tube having
   a neck portion adapted to be connected to a fitting of said gauge,
   a body portion connected at one end to said neck portion, the walls of said body portion being flattened and the peripheral portions thereof being compressed by cold working to a reduced thickness to thereby increase the yield point thereof to a spring temper and the central portions thereof being compressed relatively less than said peripheral portions and not cold worked to thereby form an axially extending channel which provides for enhanced pressure transmission along the tube, and
   the other end of said body portion being sealed,
   the interior of said neck portion adapted to be in pressure communication with the fitting, and the interior of said body portion adapted to be in pressure communication through said channel with the interior of said neck portion,
   whereby a change in the pressure applied to said fitting is communicated along the interior of said body portion through said channel changing the differential pressure across the walls of said body portion and causing a corresponding change in the volume thereof.

2. The spring assembly of claim 1 wherein said peripheral portions of the walls of said body portion are cold worked to a reduced thickness of 70 to 95 percent of their original thickness.

3. The spring assembly of claim 1 wherein said tube is stainless steel.

4. The spring assembly of claim 1 wherein said tube is thin-walled stainless steel.

5. The spring assembly of claim 4 wherein the walls of said tube are about 0.002 to 0.003 inch thick.

6. The spring assembly of claim 1 wherein said central portions of the walls of said body portion extend from said peripheral portions in the same direction, one of said central portions having a convex wall portion and the other having a concave wall portion, and said body portion is flattened transversely and coiled longitudinally forming a helix.

7. The spring assembly of claim 6 wherein said convex wall portion is oriented radially outward to provide a long swing in response to pressure changes.

8. The spring assembly of claim 6 wherein said convex wall portion is oriented radially inward to provide a short swing in response to pressure changes.

* * * * *